(12) United States Patent
Jackson et al.

(10) Patent No.: US 7,913,759 B2
(45) Date of Patent: Mar. 29, 2011

(54) METHOD FOR ENHANCED RECOVERY OF OIL FROM OIL RESERVOIRS

(75) Inventors: Scott Christopher Jackson, Wilmington, DE (US); Peter A. Morken, Wilmington, DE (US); George David Robinson, Matthews, NC (US); Elliott Echt, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 114 days.

(21) Appl. No.: 12/240,234

(22) Filed: Sep. 29, 2008

(65) Prior Publication Data

US 2010/0078168 A1    Apr. 1, 2010

(51) Int. Cl.
*E21B 43/22* (2006.01)
(52) U.S. Cl. .................. 166/270.1; 166/275; 166/300
(58) Field of Classification Search .................. None
See application file for complete search history.

(56) References Cited

U.S. PATENT DOCUMENTS

| | | | |
|---|---|---|---|
| 2,802,785 A | 4/1957 | Nowak et al. | |
| 3,085,063 A | 4/1963 | Turbak | |
| 3,421,582 A | 1/1969 | Fallgatter et al. | |
| 3,757,863 A | 9/1973 | Clampitt et al. | |
| 4,678,032 A | 7/1987 | Shu | |
| 4,885,105 A | 12/1989 | Yang et al. | |
| 6,818,709 B1 | 11/2004 | Viari | |
| 2003/0191030 A1 * | 10/2003 | Blair et al. | 507/225 |
| 2005/0154120 A1 | 7/2005 | Echt et al. | |
| 2006/0035042 A1 | 2/2006 | Morken | |
| 2007/0034575 A1 | 2/2007 | Tufano et al. | |

OTHER PUBLICATIONS

T. Moritani et al., Functional Modification of Poly (Vinyl Alcohol) by Copolymerization: II. Modification with a Sulfonate Monomer, Polymer, 1998, vol. 39:553-557.
E. Chiellini et al., Biodegradation of Poly (Vinyl Alcohol) Based Materials, Prog. Polym. Sci., 2003, vol. 28:963-1014.
U.S. Appl. No. 12/023,166, filed Jan. 31, 2008, Applicant: Scott Christopher Jackson.

* cited by examiner

*Primary Examiner* — Zakiya W. Bates
(74) *Attorney, Agent, or Firm* — Roger W. Herrell, Jr.

(57) ABSTRACT

The present invention provides a method for recovering oil from a subterranean reservoir using waterflooding, wherein the flooding fluid used in the waterflooding process comprises water and one or more ionic polyvinyl alcohol copolymers. The use of one or more ionic polyvinyl alcohol copolymers is expected to increase the recovery of oil by improving both the oil/water mobility ratio and the sweep efficiency in reservoirs with a high degree of heterogeneity.

32 Claims, No Drawings

METHOD FOR ENHANCED RECOVERY OF OIL FROM OIL RESERVOIRS

FIELD OF THE INVENTION

The present invention relates to a process for recovering crude oil from oil reservoirs using a flooding fluid comprising water and one or more ionic polyvinyl alcohol copolymers.

BACKGROUND OF THE INVENTION

In the recovery of oil from oil-bearing reservoirs, it is typically possible to recover only minor portions of the original oil in place by primary recovery methods which utilize only the natural forces present in the reservoir. Thus a variety of supplemental techniques have been developed and used to increase oil recovery. A commonly used secondary technique is waterflooding which involves injection of water into the oil reservoir. As the water moves through the reservoir, it displaces oil therein to one or more production wells through which the oil is recovered.

One problem encountered with waterflooding operations is the relatively poor sweep efficiency of the water, i.e., the water can channel through certain portions of the reservoir as it travels from the injection well(s) to the production well(s), thereby bypassing other portions of the reservoir. Poor sweep efficiency may be due, for example, to differences in the mobility of the water versus that of the oil, and permeability variations within the reservoir which encourage flow through some portions of the reservoir and not others.

Various enhanced oil recovery techniques have been used to improve sweep efficiency. One such technique involves increasing the viscosity of the water using non-biodegradable thickening agents such as polyvinyl aromatic sulfonates as described in U.S. Pat. No. 3,085,063. U.S. Pat. No. 4,678,032 describes a method for treating a subterranean formation by injecting a polymer solution which includes an essentially non-ionic polymer selected from the group consisting of poly(vinylalcohol-co-vinylcarboxyl) and poly(vinylalcohol-co-vinylether), which is crosslinked with a transition metal selected from Groups IIIa-VIa, VII, and Ib-Vb of the Periodic Table to form a gel. Such cross linked polymer systems require a crosslinker and monomer/polymer in at the current concentration, at the same location and at a temperature appropriate for crosslinking to occur deep in the reservoir. Such conditions are difficult to achieve in reality. Furthermore, the crosslinkers are often expensive for the amounts required and the polymer system are not readily dissolvable in cold ocean water where it may be required, for example, on a oil production platform at sea.

There is therefore a need for a method to improve sweep efficiency using cost-effective, biodegradable materials that exhibit shear-thinning properties and thus exhibit lower viscosity during injection and increased viscosity in the oil reservoir. The present invention provides such a method. Another aspect of this invention is to provide a polymer for this application that is readily soluble in cold sea water. Application of such a polymer would be an advantage for operations on an oil platform at sea (for example, the North Sea), since the water used for flooding the oil reservoir is cold sea water and there are no or limited resources on typical platforms to heat up sea water to help dissolve the polymer.

SUMMARY OF THE INVENTION

The present invention relates to the recovery of oil from a subterranean reservoir using waterflooding. In one aspect, the present invention provides a method for recovering oil from a reservoir by waterflooding, comprising:

(a) introducing an aqueous flooding fluid into the reservoir, wherein at least one portion of said flooding fluid comprises one or more ionic polyvinyl alcohol copolymers, said one or more ionic polyvinyl alcohol copolymers comprising:
    (i) one or more anionic comonomers present at a total of about 1 to about 5 mol % relative to the combined moles of vinyl alcohol and vinyl acetate;
    (ii) optionally, one or more non-ionic comonomers present at about 0 to about 7 mol % relative to the combined moles of vinyl alcohol and vinyl acetate;
wherein the total monomers in (i) and (ii) are present at less than or equal to about 8 mol %; wherein the hydrolysis level of the one or more ionic polyvinyl alcohol copolymers is greater than or equal to about 90%; and wherein the one or more ionic polyvinyl alcohol copolymers dissolves substantially completely in water at about 25° C. within about 14 hours; and (b) displacing oil in the reservoir with said flooding fluid into one or more production wells, whereby the oil is recoverable.

In another aspect, the present invention provides a flooding fluid for use in water flooding operations.

DETAILED DESCRIPTION

The present invention relates to the recovery of oil from a subterranean reservoir using waterflooding. Waterflooding is a technique that is commonly used for secondary oil recovery from oil reservoirs. According to this technique, water is injected through one or more wells into the reservoir, and as the water moves through the reservoir, it acts to displace oil therein to one or more production wells through which the oil is recovered. According to the present invention, the efficacy of waterflooding is improved through the use of one or more ionic polyvinyl alcohol copolymers. Thus, in one aspect, the present invention provides a flooding fluid for use in waterflooding operations comprising water, wherein at least one portion of said water comprises one or more ionic polyvinyl alcohol copolymers, said one or more ionic polyvinyl alcohol copolymers. The copolymers could contain anionic comonomers (such as $C_1$ to $C_4$ straight-chain or branched alkyl esters of acrylic or methacrylic acid) from about 0 to about 7 mol % (or less than 8 mol %) relative to the combined moles of vinyl alcohol and vinyl acetate. In the present invention, the hydrolysis level of the one or more ionic polyvinyl alcohol copolymers is greater than or equal to about 90%; and one or more ionic polyvinyl alcohol copolymers dissolves greater than or equal to about 95%, in water at about 25° C. within about 14 hours.

The invention also discloses a method for recovering oil from a reservoir by waterflooding, through introducing an aqueous flooding fluid into the reservoir. In one aspect, the flooding fluid comprises one or more ionic polyvinyl alcohol copolymers and one or more ionic polyvinyl alcohol copolymers to a total of about 1 to about 5 mol % relative to the combined moles of vinyl alcohol and vinyl acetate.

The following definitions are provided for the special terms and abbreviations used in this application:

As used herein, "shear thinning" refers to the reduction of viscosity of a liquid (such as that portion of the flooding fluid comprising the one or more ionic polyvinyl alcohol copolymers) under shear stress. "Viscosity" refers to the resistance of a liquid (such as water or oil) to flow.

The term "water" refers to water that can be supplied from any suitable source, and can include, for example, sea water, brine, production water, water recovered from an underground aquifer, including those aquifers in contact with the oil, or surface water from a stream, river, pond or lake. As is known in the art, it may be necessary to remove particulates from the water prior to injection into the one or more wells.

The term "mobility" refers to the ratio of the permeability to the flow of a liquid to the dynamic viscosity of said liquid (Boatright, KE, 2002, Basic Petroleum Engineering Practices, 9.6; see also Integrated Petroleum Management—A Team Approach, (A. Sattar and G. Thakurm, PennWell Books, Tulsa, Okla., 1994)).

The term "mobility ratio" is the mobility of the water ratioed to that of the mobility of the oil. Mobilization of oil is enhanced from an underground oil containing reservoir or rock when the mobility of the oil is more than the mobility of the water—that is this ratio is less than one—in this case the mobility ratio is considered favorable for mobilizing oil. However, even if the mobility ratio is greater than one which may be the case more oil can be produced by thickening the water and moving this ratio lower even if the ratio is not less than one.

The term "viscosity ratio" is defined as the ratio of the solution viscosity measured at that temperature and at a shear rate of 1 $sec^{-1}$ to the solution viscosity measured at that temperature and at a shear rate of 10 $sec^{-1}$ The term "production wells" refers to wells through which oil is withdrawn from a reservoir. An oil reservoir or oil formation is a subsurface body of rock having sufficient porosity and permeability to store and transmit oil.

The term "one or more ionic polyvinyl alcohol copolymers" refers to one or more polyvinyl alcohol copolymers. Polyvinyl Alcohol (PVOH) is manufactured commercially by polymerization of vinyl acetate monomer (VAM) to afford polyvinyl acetate (PVAc). The PVAc is then transesterified—in most commercial processes with methanol, in which case it is also described as methanolysis—to yield PVOH and methyl acetate. The % hydrolysis (or hydrolysis level) of the polymer is defined as the molar amount of vinyl alcohol divided by the sum of the molar amount of vinyl alcohol plus the molar amount of vinyl acetate in the polymer. In one aspect, the % hydrolysis is greater than or equal to about 95%. In a more specific aspect, the % hydrolysis is greater than or equal to about 98%. In an even more specific aspect, the % hydrolysis is greater than or equal to about 99%.

PVOH homopolymer that is >98% hydrolyzed (that is, less than 2% residual vinyl acetate) is not suitable for the present invention because it does not dissolve at practical temperatures, as it usually requires temperatures in excess of 50° C. to dissolve. For the present invention polymers that dissolve in water at a temperature of less than about 25° C. are preferred. This can be accomplished by modifying PVOH to reduce crystallinity and/or increase hydrophilicity of the polymer. The crystallinity of the polymer can be reduced by carrying out the transesterification of PVAc in such a manner as to not complete the conversion to PVOH and obtain a product that is conventionally known as partially hydrolyzed PVOH (phPVOH). Commercial grades of 88% hydrolyzed phPVOH include Celvol™ 523 from Celanese (Dallas, Tex.) and Kuraray POVAL™ PVA 217 sold by Kuraray Co., Ltd. (Osaka, JP). Post-polymerization or post-copolymerization modifications of PVOH can reduce crystallinity and/or increase the hydrophilicity of the polymer. Post polymerization reactions have been reviewed (*Polyvinyl Alcohol-Developments*; Finch, C. A., Ed.; John Wiley & Sons: New York, 1992).

One known copolymerization method to increase hydrophilicity is to copolymerize VAM with an ionic, acid-containing monomer such as acrylic acid as described in U.S. Pat. No. 4,885,105. After transesterification of such a copolymer a hydrophilic carboxylic acid or carboxylic acid salt remains. Inclusion of up to about 5 mol % comonomer can modify the polymer solubility adequately for use in the present invention. Other suitable acids include maleic acid, itaconic acid and methacrylic acid. One or more $C_1$ to $C_4$ straight-chain or branched alkyl monoesters of itaconic and maleic acid can also be used. Another useful comonomer for imparting hydrophilicity is the sodium salt of 2-acrylamido-2-methyl-1-propanesulfonate (AMPS). This sodium salt of AMPS (or SAMPS, CAS# 5165-97-9) has increased tolerance of low pH environments and high salt concentrations. The preparation of PVOH/AMPS copolymers has been described (T. Moritani and J. Yamauchi, Polymer, 39, 553-557, 1998 and U.S. Pat. No. 6,818,709). Other salt forms of AMPS can also be used for the present invention, such as potassium, ammonium, and tetramethylammonium. Salts of AMPS can be included in an amount of about 1 to about 5 mol %. In a more specific aspect, salts of AMPS can be included in an amount of from about 2 mol % to about 4 mol %. In an even more specific aspect, salts of AMPS can be included in an amount of from about 3 mol % to about 4 mol %. Copolymers with anionic groups have advantage over non-ionic, partially hydrolyzed PVOH because they generally dissolve faster.

Optionally, one or more nonionic comonomers can be copolymerized with at least one ionic monomer. Examples include the $C_1$ to $C_4$ straight-chain or branched alkyl esters of acrylic or methacrylic acid, synthesized as described in U.S. Patent Publications 2005/0154120 and 2006/0035042. Methyl acrylate or methyl methacrylate are preferred, and methyl acrylate is most preferred. Acrylate comonomers are known to form lactone rings with neighboring vinyl alcohol groups during the transesterification process (*Polyvinyl Alcohol-Developments*; Finch, C. A., Ed.; John Wiley & Sons: New York, 1992). The combination of ionic monomer and acrylate- or methacrylate-derived lactone reduces the amount of ionic monomer necessary for solubility, which has the advantages of reducing the amount of caustic catalyst necessary for transesterification, reducing water sensitivity of the solid polymer, and reducing the overall cost of the polymer. The lactone-containing polymer can be optionally treated with a base such as sodium or potassium hydroxide to form the ring-opened carboxylate form as described in US 2007/0034575, in which case the monomer is considered anionic. The acrylate or methacrylate ester can be used at about 0 mol % to about 7 mol %. In a more specific aspect, the acrylate or methacrylate ester can be used at about 2 mol % to about 5 mol %. In an even more specific aspect, the acrylate or methacrylate ester can be used at about 3 mol % to about 4 mol %. Additional non-ionic comonomers that can be utilized include ethylene, acrylamide, and vinyl pyrrolidone. It is recognized that during the transesterification process, non-ionic monomers with hydrolyzable groups such as acrylate or methacrylate esters, or acrylamide, can undergo unintentional hydrolysis reactions depending on process conditions and the amount of water.

In one aspect, the one or more ionic polyvinyl alcohol copolymers has an average molecular weight greater than about 50,000 daltons as measured by gel permeation chromatography. In a more specific aspect, the average molecular weight is greater than about 60,000 daltons. In an even more specific aspect, the average molecular weight is greater than about 70,000 daltons.

The present invention provides an advantage to existing technology in that the one or more ionic polyvinyl alcohol copolymers as defined above are biodegradable (Chiellini, E., et al., Prog. Polym. Sci., 28: 963-1014, 2003), and thus flooding fluid having these compounds can be safely released into the environment surrounding the oil recovery operation if necessary, or as an accidental release. In addition, flooding fluid comprising these compounds exhibits shear-thinning properties, such that the solution exhibits low viscosity at high shear rates and increased viscosity at low shear rates.

The flooding fluid useful for waterflooding according to the present invention comprises water and one or more cold water soluble ionic polyvinyl alcohol copolymers.

The flooding fluid useful for the waterflooding process of the invention comprises water, wherein at least a portion of said water comprises one or more ionic polyvinyl alcohol copolymers. Thus, in one aspect, the one or more ionic polyvinyl alcohol copolymers is added to a volume of water and injected into the well(s), followed by the injection of additional water. This process can be repeated one or more times if necessary. At the injection well(s), which is under high pressure and high shear, the relative viscosity of at least one portion of the flooding fluid comprising one or more ionic polyvinyl alcohol copolymers is low, whereas as at least one portion of the flooding fluid flows into the reservoir, the shear decreases and the relative viscosity increases. The one or more ionic polyvinyl alcohol copolymers can also be added to the entire volume of flooding fluid, as long as the backpressure at the injection well(s) does not become too high. As is known to those skilled in the art of oil recovery, the bottom well pressure of the injector can not exceed the strength of the rock formation, otherwise formation damage will occur at a given flow rate. Adjustments can be made by reducing the flow of the injection water, adding water to decrease viscosity, or by adding water mixed with the one or more ionic polyvinyl alcohol copolymers to increase viscosity in order to improve the efficacy of oil recovery.

The one or more ionic polyvinyl alcohol copolymers can be added as a solid powder to at least one portion of the flooding fluid. The concentration of the one or more ionic polyvinyl alcohol copolymers in at least one portion of the flooding fluid can be in the range of about 0.007% to about 3% (weight of the one or more ionic polyvinyl alcohol copolymers/total weight of the at least one portion of flooding fluid comprising said one or more ionic polyvinyl alcohol copolymers). In another aspect, the concentration is in the range of about 0.1% to about 1% (weight/weight).

In one aspect, one or more ionic polyvinyl alcohol copolymers is added to the flooding fluid in order to increase the viscosity of at least one portion of the water in the flooding fluid, thereby improving the displacement of oil to the production well(s). To achieve optimal efficiency in waterflooding operations, it is desirable that the mobility of the water be less than the mobility of the oil. The oil mobility is calculated by the formula $k_o/\mu_o$, where $k_o$ is the oil permeability and $\mu_o$ is the oil dynamic viscosity. Similarly, the water mobility is calculated by $k_w/\mu_w$, where $k_w$ is the water permeability and $\mu_w$ is the water dynamic viscosity. In typical water flooding operations the water mobility is greater than the oil mobility, thus the water will tend to channel or finger through the oil. When the one or more ionic polyvinyl alcohol copolymers is added to the at least one portion of the flooding fluid as described by aspects of the present invention, the addition of the one or more ionic polyvinyl alcohol copolymers increases the viscosity of the at least one portion of the water, thereby reducing the effective water mobility. Thus, the oil is more likely to be driven towards the production well(s).

In one aspect, the viscosity of at least one portion of the flooding fluid comprising one or more ionic polyvinyl alcohol copolymers is about 30% higher at low shear rates, wherein low shear rates are 1 $sec^{-1}$, or less, than the viscosity of the same polymer in solution measured at the same temperature but at a high shear rate of 10 $sec^{-1}$ or greater. Consequently a figure of merit that will be used to illustrate the degree of shear thinning is the viscosity ratio measured at a specific temperature. Using this figure of merit, in one aspect, this viscosity ratio for at least one portion of the flooding fluid comprising one or more ionic polyvinyl alcohol copolymers is at least 1.3. In another aspect, this viscosity ratio of at least one portion of the flooding fluid comprising one or more ionic polyvinyl alcohol copolymers is at least 2.5.

In a stratified oil-bearing formation the permeability of different geological oil-bearing layers may differ, and as a result the injected water could initially reach the production well through the most permeable layer before a substantial amount of the oil from other, less permeable, layers is retrieved. This breakthrough of injection water is problematic for oil recovery, as the water/oil ratio retrieved from the production well will increase and become more unfavorable during the lifetime of the oil field. The addition of the one or more ionic polyvinyl alcohol copolymers to at least one portion of the flooding fluid is expected to result in less water flooding the more permeable zones in a reservoir, thus reducing the chance of fingering of flooding fluid through these more permeable zones of the oil bearing strata and improving sweep efficiency.

Additional materials can optionally be added as thickening agents or surface active agents to enhance the sweep efficiency of the flooding fluid and/or reduce water mobility. These materials include at least one of the members of the group consisting of hay, sugar cane fibers, cotton seed hull, textile fibers, shredded paper, bentonite, rubber pulp, wood shavings and nut hulls, provided that these materials together with the one or more ionic polyvinyl alcohol copolymers provide the desired viscosity, concentration and/or particle size distribution. In addition, propanediol thickeners, such as one or more members of the group consisting of 1,3-propanediol; an oligomer of 1,3-propanediol; a homopolymer of 1,3-propanediol; and a heteropolymer of 1,3-propanediol, wherein said heteropolymer is synthesized using at least one $C_2$ through $C_{12}$ comonomer diol, as described in the commonly owned and copending U.S. application Ser. No. 12/023,166 (page 4). An "oligomer" of 1,3-propanediol has a degree of polymerization of 2-6, whereas a "polymer" has a degree of polymerization of at least 7. A "homopolymer" of 1,3-propanediol is a polymer synthesized using monomers of 1,3-propanediol. A "heteropolymer" of 1,3-propanediol is a polymer synthesized using 1,3-propanediol monomers as well as one or more additional $C_2$ through $C_{12}$ straight-chain or branched comonomer diols. Additional thickeners include polyacrylic amide, carboxymethylcellulose, polysaccharide, polyvinyl pyrrolidone, polyacrylic, and polystyrene sulfonates, and ethylene oxide polymers, as described in U.S. Pat. No. 3,757,863, column 2, line 33 to line 45; and methyl cellulose, starch, guar gum, gum tragacanth, sodium alginate, and gum arabic, as described in U.S. Pat. No. 3,421,582, column 2, line 33 to line 45. Each of the thickeners can be used alone, or in combination with one or more other thickeners as described above. Surfactants, such as acid salts of amido-acids as described in U.S. Pat. No. 2,802,785, column 2, line 11 to column 4, line 43 can also optionally be added. Surfactants and thickeners can also be used in combination. The use of the one or more ionic polyvinyl alcohol copolymers according to the present invention is advantageous in that the one or more ionic polyvinyl alcohol copolymers is biodegradable and does not present environmental toxicity problems. Thus, in one aspect, the additional materials that are added to flooding fluids of the invention are preferably also biodegradable, such as starch, guar gum, sodium alginate, gum arabic and methyl cellulose.

In one aspect, the present invention provides a method for making an aqueous flooding fluid for use in waterflooding, comprising adding one or more ionic polyvinyl alcohol copolymers to at least one portion of water used in waterflooding.

The flooding fluid can be recovered as it exits the production well(s) and at least one portion of said flooding fluid can be reused, i.e., injected into the reservoir. Prior to reinjection into the reservoir, additional one or more ionic polyvinyl alcohol copolymers as defined above can be added to at least one portion of the recovered flooding fluid. The additional one or more ionic polyvinyl alcohol copolymers can be added at a concentration of about 0.007% to about 3% (weight of one or more ionic polyvinyl alcohol copolymers/weight of at least one portion of flooding fluid). Alternatively, at least one portion of the flooding fluid exiting the production well(s) can be disposed of, for example by disposal at sea, in a disposal well, or in a wastewater pond.

EXAMPLES

The present invention is further defined in the following Examples. It should be understood that these Examples, while indicating the preferred aspects of the invention, are given by way of illustration only. From the above discussion and these examples, one skilled in the art can ascertain the essential characteristics of this invention, and without departing from the spirit and scope thereof, can make various changes and modifications of the invention to adapt it to various uses and conditions.

The following abbreviations are used: "rpm" is revolutions per minute; "MW" is molecular weight; "mol" is mole; "L" is liter; "mL" is milliliter; "PTFE" is polytetrafluoroethylene; "g" is gram; "mg" is milligram; "wt %" is weight percent; "cc/min" is cubic centimeters per minute; "° C." is degrees Centigrade or Celsius; "MHz" is Megahertz; "NMR" is nuclear magnetic resonance; and "GPC" is gel permeation chromatography, "F" means degrees fahrenheit.

Elvanol® 50-42, Elvanol® 71-30, and Elvanol® 70-62 were obtained from DuPont de Nemours & Co., Inc. (Wilmington, Del.).

General Methods

Preparation of Copolymers

Copolymer 1 was obtained from DuPont de Nemours & Co., Inc., and was a fully hydrolyzed grade of polyvinyl alcohol copolymer with 5.2 mol % methyl acrylate comonomer having a number average MW (Mn) of 36,300, and hydrolysis of 99.5%. Additional characteristics of Copolymer 1 are shown in Tables 2 and 3 below.

Copolymer 2 was prepared as described in U.S. Patent Application No. US2006/0035042, paragraph 11 through paragraph 25, and was a fully hydrolyzed grade of polyvinyl alcohol copolymer with 3.0 mol % methyl acrylate comonomer and 3.0 mol % itaconic acid comonomer having a number average MW (Mn) of 41,600 and hydrolysis of 99.3%. Additional characteristics of Copolymer 2 are shown in Tables 2 and 3 below.

TABLE 1

Preparation conditions for copolymers 3 through 6

| | Copolymer | | | |
|---|---|---|---|---|
| | 3 | 4 | 5 | 6 |
| AA Precharge (g) | — | — | 1.4 | 2.2 |
| IA Precharge (g) | 1.54 | 1.54 | — | — |
| MA Precharge (g) | 1.62 | 1.62 | 1.1 | 1.8 |
| AA Feed rate (cc/min) | — | — | 0.086 | 0.138 |
| IA Feed rate (cc/min) | 0.468 | 0.491 | — | — |
| MA Feed rate (cc/min) | 0.073 | 0.076 | 0.076 | 0.122 |
| Polym. Time (min.) | 85 | 75 | 45 | 40 |
| g HQ/NaNO$_2$/g MeOH | 0/2/80 | 0.2/4/130 | 0.2/4/100 | 0.2/4/100 |
| final solids (%) | 20.7 | 17.8 | 23.4 | Not determined |

Copolymers 3 through 6 were prepared as follows: (modified from AD7167 USNA Spec). A 2 L polymer kettle was assembled with an overhead stirrer, a Claisen head with a multi-inlet port fitting connected to 2 syringe pumps and a tap-H$_2$O condenser further attached to a N$_2$ bubbler, an overhead thermowell with a thermocouple device, and a septum. The agitator was a single PTFE paddle and the stir rate was set to 150-185 rpm. The kettle was charged with 1000 g vinyl acetate (Aldrich Chemical co., Milwaukee, Wis., USA) and 11 g methanol (EM Science). Itaconic acid (IA, Aldrich), methyl acrylate (MA, Aldrich), and acrylic acid (AA, Aldrich) were then charged to the kettle in the amount specified in Table 1. The mixture was degassed at room temperature for 20 minutes with a sparging tube. The kettle was then heated with a 77-85° C. oil bath. One syringe pump was charged with neat methyl acrylate. A second syringe pump was charged with neat acrylic acid or a 24.7 wt % solution of itaconic acid in MeOH. 2 g of VAZO-64 (DuPont, Wilmington, Del., USA) dissolved in 100 g of MeOH was added to the reactor. The two syringe pumps were then activated to feed at the rates specified in the table. The polymerization was allowed to proceed for the time indicated in the table then a mixture of hydroquinone (HQ, Aldrich), sodium nitrite (Aldrich) and MeOH were added all at once to halt the polymerization. The solids were determined by average of 3 samples of about 0.5 g weight that were dried 18 hour in a 80° C. vacuum oven. The polyvinyl acetate terpolymer was transferred to a 3 L round bottom flask and the MeOH/vinyl acetate azeotrope was removed under reduced pressure. Addition of 500 g of MeOH followed by azeotropic distillation was repeated 3 times, at which time removal of vinyl acetate was judged substantially complete.

TABLE 2

Characteristics of copolymers

| PVOH | 4% Aqueous Solution Viscosity (cP) | % Hydrolysis | Methyl Acrylate (mol %) | Itaconic Acid (mol %) | Acrylic Acid (mol %) | GPC Number Average MW | GPC Weight Average MW | Solubility in Sea Water Simulant at 45-46° F. |
|---|---|---|---|---|---|---|---|---|
| Copolymer 3 | 72 (b) | 99.2% (c) | 3.0 | 2.8 | | 73,700 | 171,800 | 50% soluble @ 120 min. |
| Elvanol 71-30 | 27.0-33.0 (a) | 99.0-99.8 (a) | — | — | | 46,400 | 96,000 | (e) |
| Elvanol 50-42 | 44.0-50.0 (a) | 87.0-89.0 (a) | — | — | | 73,580 | 132,800 | 50% soluble @ 120 min. |
| Elvanol 70-62 | 58.0-68.0 (a) | 99.4-99.8 (a) | — | — | | 55,800 | 148,000 | (e) |
| Copolymer 1 | 20 (b) | 99.5% (d) | 5.2 | — | | 36,300 | 70,900 | (e) |
| Copolymer 2 | 19 (b) | 99.3% (c) | 3.0 | 3.0 | | 41,600 | 77,700 | 10 min. |
| Copolymer 4 | 64 (b) | 99.1% (c) | 3.2 | 2.9 | | 88,750 | 202,800 | 95% soluble in 90 min. |
| Copolymer 5 | 99 | 100 (c) | 1.6 | | 2.3 | 99,900 | 199,100 | 0% soluble in 120 min. |
| Copolymer 6 | 105 | 99.8 (c) | 2.7 | | 3.9 | 98,900 | 256,800 | 100% dissolved 50 min. |

(a) manufacturer specification
(b) measured value
(c) measured by ATR method
(d) measured by NMR method
(e) insoluble in cold water, so not subjected to the test The polyvinyl acetate was converted to polyvinyl alcohol by transesterification with methanol and sodium methoxide. The polyvinyl acetate was divided into two equal portions and subjected to the same procedure. Polyvinyl acetate dissolved in MeOH was charged to a 1 gallon explosion-proof stainless steel blender (Eberbach Corp., Ann Arbor, Mich.). The blender was set to stir at 10,000 rpm then 1.5 g of 25 wt % sodium methoxide in methanol (Aldrich) per gram of polyvinyl acetate was added through a small hole in the blender's cover. The ensuing heterogeneous mixture was stirred for 10 minutes, then 1.2 molar equivalents of glacial acetic acid (EM Science) relative to sodium methoxide were slowly added. The mixture was stirred 2 minutes, then filtered. The polymer product was rinsed 4 times with MeOH, then dried in a vacuum oven at 80° C. overnight.

The compositions of Copolymers 3, 4, and 5, Table 2, were determined by mass balance analysis assuming the acrylic acid, methyl acrylate and itaconic acid were 100% incorporated into the terpolymer. NMR analysis confirmed 3.8 mol % total acrylic acid and methyl acrylate comonomer content in Copolymer 5, which is in good agreement with the mass balance composition determination of 3.9 mol %. The NMR analysis was used to determine that Copolymer 6 was 6.6 mol % total comonomers. The AA:MA ratio was 59.6:40.4 therefore a comonomer loading of 3.9 mol % AA and 2.7 mol % MA was calculated.

The polymers used in Examples 1-16 are characterized in Table 2 and 3. In Table 2, the 4% Aqueous solution viscosity was measured with a falling ball or falling needle viscometer as is well known in the art (Polyvinyl Alcohol Properties and Applications, ed. by C. A. Finch, Wiley, New York, 1973, p 570) % Hydrolysis values were determined by $^1$H NMR analysis at 80° C. at 400 MHz (Bruker, Billerica, Mass.) in $D_2O$ or by the attenuated total reflection infrared (ATR) method (Smith Detection Scientific, Danbury, Conn.). The $D_2O$ was 100% grade from Cambridge Isotope Laboratories, Inc., (Andover, Mass.). As confirmed by ATR analysis, a series of polyvinyl alcohol samples with % hydrolysis values ranging from 86.6-99.6% as determined using an aqueous saponification method (as described in Finch, C. A., (ed) Polyvinyl Alcohol-Developments (John Wiley & Sons, New York, 1992, page 754) were synthesized.

A ratio of the acetate methyl absorption at 1273 cm$^{-1}$ to the 844 cm$^{-1}$ PVOH methylene peak was determined. A calibration curve was then plotted using the calculated ratios, and the calibration curve was used to determine the % hydrolysis values of the polyvinyl alcohol samples. GPC data were acquired using a 150CV system from Waters Corporation (Milford, Mass.) according to the manufacturer recommendations with dimethyl sulfoxide (DMSO), dimethyl acetamide (DMAc), or hexafluoroisopropanol mobile phases. Solubility was assessed by charging a 20 mL vial equipped with a magnetic stir bar and cap with 50 mg of polyvinyl alcohol and 3 mL of water and stirring at 22-25° C. Visual observations of solubility were made periodically.

An additional test method was employed to determine the comonomer content of the Acrylic Acid terpolymers for copolymers 5 and 6. 10 mg of the sample was dissolved in $D_2O$ (100% grade, Cambridge) after thorough mixing using a Vortex mixer. The $^1$H NMR spectrum was acquired in a Bruker 500 MHz NMR spectrometer with a 5 mm BBIz probe (228) at 80° C., acquisition time 4.68 s, a 90 degree pulse of 8.15 microseconds and a recycle delay of 30 s. 16 scans were acquired. Immediately after, the sample was removed from the magnet, cooled down for a few minutes and then 3.6 μL of NaOD was added (CAS 14014-06-3 Product number: 37,207-2, Aldrich Chemical Co.)

TABLE 3

Summary of viscosity ratio of the polymers tested.

| Example | Polymer or copolymer | Wt % of polymer in solution | Viscosity Ratio* at at 25 C. | Viscosity Ratio* at 55 C. | Viscosity Ratio* at 80 C. | Dissolves easily? |
|---|---|---|---|---|---|---|
| 1 | 3 | 0.1 in fresh water | 1.4 | 1.0 | 14.7 | No (fresh water) |
| 2 | 3 | 0.1 | 1.5 | 1.8 | 2.7 | No (sea water) |
| 3 | 3 | 0.5 | 1.7 | 2.1 | 8.9 | No (sea water) |
| 4 | Elvanol ® 71-30 | 0.1 | 2.7 | 2.6 | 7.8 | No |
| 5 | Elvanol ® 50-42 | 0.1 | 2.5 | 0.9 | 3.0 | No |
| 6 | Elvanol ® 70-62 | 0.1 | 1.1 | 6.6 | 304.2 | No |
| 7 | 1 | 0.1 | 2.0 | 2.4 | 2.5 | No |
| 8 | 2 | 0.1 | 0.8 | 0.8 | 1.7 | Yes |
| 9 | 2 | 1.0 | 0.9 | 1.7 | 1.5 | Yes |
| 10 | 4 | 0.1 | 3.6 | 3.7 | 5.1 | yes |
| 11 | 4 | 0.3 | 1.4 | 2.5 | 3.5 | yes |
| 12 | 5 | 0.1 | 2.3 | 1.3 | 4.0 | No |
| 13 | 5 | 1.0 | 1.0 | 1.1 | 1.1 | No |
| 14 | 6 | 0.1 | 2.6 | 3.2 | 6.2 | Yes |
| 15 | 6 | 1.0 | 1.6 | 2.5 | 3.5 | yes |

*Ratio of the viscosity measured at that temperature and at a shear rate of 1 sec$^{-1}$ to the viscosity measured at that temperature and at a shear rate of 10 sec$^{-1}$ In Table 3, the ratio of viscosity was determined from viscosity measurements taken as a function of shear rate using a Brookfield DV-II+ Pro instrument (Brookfield Engineering Laboratories, Inc., Middleboro, Mass.) using a UL adaptor with water jacketed cup and remote temperature detection probe. The instrument was controlled using Rheocal software v2.7. The shear rate was varied from 0.25 sec$^{-1}$ to 250 sec$^{-1}$ at 25, 55 and 80° C. Values of viscosity at a shear rate of 1 sec$^{-1}$ and 10 sec$^{-1}$ were used in the calculation of the viscosity ratio. This viscosity ratio was measured at the various temperatures to match the likely range in the reservoir temperature. Most reservoirs are warm but cool down near the injector well under prolonged water flood. Near the injector well bore, the temperatures are near 25° C. As the water moves out away from the injector to the producer, temperatures rise and the amount of oil that is likely to be left in the formation also increases as distance away from the injector to the producer well increases. Hence it is desirable to have a high viscosity ratio at a high temperature, e.g., 80° C.

Example 1

Behavior of Copolymer 3 in Deionized Water

Copolymer 3 was dissolved in deionized water to a concentration of 0.1 weight percent. It took overnight agitation at room temperature to dissolve the polymer. The viscosity was measured as described above and the viscosity ratio calculated and is presented in Table 3. Although this polymer did not quickly dissolve in deionized water, the viscosity ratio showed significant thickening at the highest temperature, e.g., 80° C. Consequently this polymer system would work for polymer flooding applications but only if more time or warmer water were used to dissolved the polymer.

Example 2

Behavior of Copolymer 3 in Sea Water at 0.1 Weight Percent

Copolymer 3 was dissolved in synthetic sea water to a concentration of 0.1 weight percent. Synthetic sea water was acquired from EMD Chemicals Inc, (Gibbstown N.J., Part number GC0118/1, lot#7050). Although it eventually completely dissolved, it was only 50% dissolved in synthetic seawater at 45° F. after 120 minutes. The viscosity and sheer rate were measured and the raw data smoothed by taking a 3 point running average. The viscosity ratio is shown in Table 3. The viscosity ratio for copolymer 3 did show improved with increasing temperature and showed had a value of 2.7 at 80° C. Consequently this polymer system would work for polymer flooding applications but only if more time or warmer water was used to dissolved the polymer.

Example 3

Behavior of Copolymer 3 in Sea Water at 0.5 Weight Percent

Copolymer 3 was dissolved in synthetic sea water to a concentration of 0.5 weight percent. Synthetic sea water was acquired from EMD Chemicals Inc, Gibbstown N.J., Part number GC0118/1, lot#7050. Although it eventually completely dissolved, it was only 50% dissolved in synthetic seawater at 45° F. after 120 minutes. The viscosity and sheer rate were measured and the raw data smootherd as described above. The viscosity ratio is shown in Table 3. The viscosity ratio for this higher concentration of copolymer 3 increased with increasing temperature and had a greater ratio at this higher concentration compared to Example 2. It had a viscosity ratio value of 8.9 at 80° C. Consequently this polymer system, at this higher concentration, would work for polymer flooding applications but only if more time or warmer water were used to dissolved the polymer.

Example 4

Effect of Continuous Agitation at High Temperature on Dissolution of Dupont Elvanol® 71-30

DuPont Elvanol® 71-30 polymer was dissolved in synthetic sea water to a concentration of 0.1 weight percent. Dissolution required continuous agitation and heating at 80°

C. to 90° C. for a day. The viscosity and sheer rate of this solution were measured and the raw data smoothed as described above. The viscosity ratio is shown in Table 3. The viscosity ratio, with a value of 7.8 at 80° C., had increased with increasing temperature. Consequently this polymer system, at this higher concentration, would work for polymer flooding applications but only if more time or warmer water were used to dissolved the polymer.

Example 5

Behavior of DuPont Elvanol® 50-42 in Sea Water at 0.1 Weight Percent

DuPont Elvanol® 50-42 homopolymer was dissolved in synthetic sea water to a concentration of 0.1 weight percent. Dissolution required continuous agitation and heating at 80° C. to 90° C. for about a day. The viscosity and sheer rate were measured and the raw data smoothed as described above. The viscosity ratio is shown in Table 3. The viscosity ratio favorable at 25° C. and 80° C. but not at 55° C. The viscosity ratio was not as great as many of the other polymer systems tested in Table 3. Consequently this polymer system would work but not as well as other tested for polymer flooding applications but only if more time or warmer water were used to dissolved the polymer

Example 6

Behavior of DuPont Elvanol® 70-62 in Sea Water at 0.1 Weight Percent

DuPont Elvanol® 70-62 homopolymer was dissolved in synthetic sea water to a concentration of 0.1 weight percent. Dissolution required continuous agitation and heating at 80 to 90 C for about a day. The viscosity and sheer rate were measured and the raw data smoothed as described above. The viscosity ratio is shown in Table 3. The viscosity ratio was observed to increase with increasing temperature and had a remarkably high viscosity ratio value of 304 at 80° C. Consequently this polymer system would work for polymer flooding applications but only if more time or warmer water were used to dissolved the polymer.

Example 7

Behavior of Copolymer 1 in Sea Water at 0.1 Weight Percent

Copolymer 1 was dissolved in synthetic sea water to a concentration of 0.1 weight percent. Dissolution required continuous agitation and heating at 80° C. to 90° C. for about a day. The viscosity and sheer rate were measured and the raw data smoothed as described above The viscosity ratio is shown in Table 3. Although viscosity ratio is favorable, its ratio was not as significant as some of the other polymer systems tested in Table 3. Consequently this polymer system would work but not as well as other tested for polymer flooding applications but only if more time or warmer water was used to dissolved the polymer

Example 8

Behavior of Copolymer 2 in Sea Water at 0.1 Weight Percent

Copolymer 2 was dissolved in synthetic sea water to a concentration of 0.1 weight percent. The polymer readily dissolved in cold synthetic sea water within a few minutes as indicated in Table 2. The viscosity and sheer rate were measured and the raw data smoothed as described above. The viscosity ratio is shown in Table 3. The viscosity ratio is only slightly favorable at 80° C. This polymer system at this concentration had the poorest viscosity ratios. This example illustrates that the compositional changes needed to make a polymer soluble (low molecular weight in this case) will lead to poor shear thinning. Consequently this polymer system would not work well in polymer flooding applications despite being readily dissolvable.

Example 9

Behavior of Copolymer 2 in Sea Water at 1.0 Weight Percent

Copolymer 2 was dissolved in synthetic sea water to a concentration of 1 weight percent. This was an attempt to see if higher concentrations of copolymer 2 would results in higher viscosity ratios. The polymer readily dissolved in cold synthetic sea water within a few minutes as indicated in Table 2. The viscosity and sheer rate were measured and the raw data smoothed as described above. The viscosity ratio is shown in Table 3. The viscosity ratio is only slightly favorable at 80° C. This polymer system at this concentration had viscosity ratios comparable to example 8. This example illustrates, in this case, higher concentrations had minimal improvements in viscosity ratio. Consequently, as in the case in Example 8, this polymer system would not work well in polymer flooding applications despite being readily dissolvable.

Example 10

Behavior of Copolymer 4 in Sea Water at 0.1 Weight Percent

Copolymer 4 was dissolved in synthetic sea water to a concentration of 0.1 weight percent. The polymer dissolved in cold synthetic sea water within 90 minutes as indicated in Table 2. The viscosity and sheer rate were measured and the raw data smoothed as described above. The viscosity ratio is shown in Table 3. The viscosity ratio is favorable at all temperatures and is substantially higher than the copolymer 2 (Examples 8 and 9). Copolymers 4 and 2 are nearly the same composition but Copolymer 4 has a substantially higher molecular weight. When compared to Examples 8 and 9, the higher molecular weight gives favorable viscosity ratios and a longer but favorable dissolution time. Consequently, this polymer system would work well in polymer flooding applications and is also dissolvable in cold sea water.

Example 11

Behavior of Copolymer 4 in Sea Water at 0.3 Weight Percent

Copolymer 4 was dissolved in synthetic sea water to a concentration of 0.3 weight percent. This was an attempt to see if higher concentrations of copolymer 4 would results in higher viscosity ratios. The polymer dissolved in cold synthetic sea water within 90 minutes as indicated in Table 2. The viscosity and sheer rate were measured and the raw data smoothed as described above The viscosity ratio is shown in Table 3. The viscosity ratio is favorable at all temperatures and is substantially higher than the copolymer 2 (Examples 8 and 9). However, when compared to Example 10 the higher concentration of this copolymer did not lead to higher viscosity ratios although these ratios are still favorable. Consequently, this polymer system would work well in polymer flooding applications and is also dissolvable in cold sea water.

Example 12

Behavior of Copolymer 5 in Sea Water at 0.1 Weight Percent

Copolymer 5 was dissolved in synthetic sea water to a concentration of 0.1 weight percent. Although it eventually completely dissolved, none was dissolved in synthetic seawater at 45° F. after 120 minutes. The viscosity and sheer rate were measured and the raw data smoothed as described above. The viscosity ratio is shown in Table 3. The viscosity ratio is favorable at all temperatures and is substantially higher than the copolymer 2 at a comparable concentration (Example 8) but not as good as Copolymer 4 (Example 10). This illustrates the effect of changing the comonomer composition. This polymer system would work in polymer flooding applications but is not readily dissolvable in cold sea water.

Example 13

Behavior of Copolymer 5 in Sea Water at 1.0 Weight Percent

Copolymer 5 was dissolved in synthetic sea water to a concentration of 1 weight percent. Although it eventually completely dissolved, none was dissolved in synthetic seawater at 45° F. after 120 minutes. The viscosity and sheer rate were measured and the raw data smoothed as described above. The viscosity ratio is shown in Table 3. Remarkably, the viscosity ratio is not favorable at all temperature. This illustrates that a higher concentration in solutions (as compared to Example 12) does not necessarily translate to a higher viscosity ratio. This polymer system, at this higher concentration, would not work in polymer flooding applications and is not readily dissolvable in cold sea water.

Example 14

Behavior of Copolymer 6 in Sea Water at 0.1 Weight Percent

Copolymer 6 was dissolved in synthetic sea water to a concentration of 0.1 weight percent. The polymer dissolved in cold synthetic sea water within 50 minutes as indicated in Table 2. The viscosity and sheer rate were measured and the raw data smoothed as described above The viscosity ratio is shown in Table 3. The viscosity ratio is favorable at all temperatures and is substantially higher than the copolymer 5 at a comparable concentration (Example 12) and is comparable to Copolymer 4 (Example 10). This illustrates the effect of changing the comonomer composition while keeping about the same molecular weight of the polymer. This polymer system would work in polymer flooding applications and is readily dissolvable in cold sea water.

Example 15

Behavior of Copolymer 6 in Sea Water at 1.0 Weight Percent

Copolymer 6 was dissolved in synthetic sea water to a concentration of 1 weight percent. The polymer dissolved in cold synthetic sea water within 50 minutes as indicated in Table 2. The viscosity and sheer rate were measured and the raw data smoothed as described above. The viscosity ratio is shown in Table 3. The viscosity ratio is favorable at all temperatures and is substantially higher than the copolymer 5 at a comparable concentration (Example 13) and is comparable to Copolymer 4 (Example 11). This illustrates the effect of changing the comonomer composition while keeping about the same molecular weight of the polymer. When compared to Example 14, it also illustrates that a higher polymer concentration in solution does not lead to higher viscosity ratios. This polymer system would work in polymer flooding applications and is readily dissolvable in cold sea water.

What is claimed is:

1. A method for recovering oil from a reservoir by waterflooding, comprising:
   (a) introducing an aqueous flooding fluid into the reservoir, wherein at least one portion of said flooding fluid comprises vinyl alcohol and vinyl acetate and one or more ionic polyvinyl alcohol copolymers, said one or more ionic polyvinyl alcohol copolymers comprising:
      (i) one or more anionic comonomers present at a total of about 1 to about 5 mol % relative to the combined moles of vinyl alcohol and vinyl acetate;
      (ii) optionally, one or more non-ionic comonomers present at about 0 to about 7 mol % relative to the combined moles of vinyl alcohol and vinyl acetate;
      wherein the total monomers in (i) and (ii) are present at less than or equal to about 8 mol %; wherein the hydrolysis level of the one or more ionic polyvinyl alcohol copolymers is greater than or equal to about 90%; and wherein the one or more ionic polyvinyl alcohol copolymers dissolves substantially completely in water at about 25° C. within about 14 hours; and
   (b) displacing oil in the reservoir with said flooding fluid into one or more production wells, whereby the oil is recoverable.

2. The method of claim 1, wherein said one or more anionic monomers is selected from the group consisting of itaconic acid, one or more $C_1$ to $C_4$ straight-chain or branched alkyl monoesters of itaconic acid, maleic acid, one or more $C_1$ to $C_4$ straight-chain or branched alkyl monoesters of maleic acid, sodium 2-acrylamido-2-methyl-1-propanesulfonate, acrylic acid or methacrylic acid.

3. The method of claim 2, wherein said one or more anionic monomers is itaconic acid or one or more $C_1$ to $C_4$ straight-chain or branched alkyl monoesters of itaconic acid.

4. The method of claim 2, wherein said one or more anionic monomers is sodium 2-acrylamido-2-methyl-1-propanesulfonate.

5. The method of claim 2, wherein said one or more anionic monomers is maleic acid or one or more $C_1$ to $C_4$ straight-chain or branched alkyl monoesters of maleic acid.

6. The method of claim 1, wherein said one or more non-ionic comonomers is one or more $C_1$ to $C_4$ straight-chain or branched alkyl esters of acrylic or methacrylic acid.

7. The method of claim 1, wherein said one or more non-ionic comonomers is selected from the group consisting of ethylene, acrylamide and vinyl pyrrolidone.

8. The method of claim 1, wherein said one or more non-ionic comonomers is methyl acrylate.

9. The method of claim 1, wherein the hydrolysis level of the one or more ionic polyvinyl alcohol copolymers is greater than or equal to about 95%.

10. The method of claim 9, wherein the hydrolysis level of the one or more ionic polyvinyl alcohol copolymers is greater than or equal to about 98%.

11. The method of claim 10, wherein the hydrolysis level of the one or more polyvinyl alcohol copolymers is greater than or equal to about 99%.

12. The method of claim 11, wherein said one or more anionic monomers is itaconic acid and said one or more non-ionic comonomers is methyl acrylate.

13. The method of claim 9, wherein said one or more anionic monomers is sodium 2-acrylamido-2-methyl-1-propanesulfonate.

14. The method of claim 9, wherein said one or more anionic monomers is itaconic acid or one or more $C_1$ to $C_4$ straight-chain or branched alkyl monoesters of itaconic acid.

15. The method of claim 9, wherein said one or more anionic monomers is maleic acid or one or more $C_1$ to $C_4$ straight-chain or branched alkyl monoesters of maleic acid.

16. The method of claim 1, wherein the one or more ionic polyvinyl alcohol copolymers has a number average molecular weight greater than about 50,000 daltons as measured by gel permeation chromatography.

17. The method of claim 1, wherein the one or more ionic polyvinyl alcohol copolymers has a number average molecular weight greater than about 60,000 daltons as measured by gel permeation chromatography.

18. The method of claim 1, wherein the one or more ionic polyvinyl alcohol copolymers has a number average molecular weight greater than about 70,000 daltons as measured by gel permeation chromatography.

19. The method of claim 1, wherein said flooding fluid is recovered, and wherein at least one portion of said the recovered flooding fluid is reinjected into the reservoir.

20. The method of claim 19, wherein said recovered flooding fluid is supplemented with one or more ionic polyvinyl alcohol copolymers, said one or more ionic polyvinyl alcohol copolymers dissolves substantially completely in water at about 25° C. within about 14 hours; prior to reinjection.

21. The method of claim 1 or claim 20, wherein, said one or more ionic polyvinyl alcohol copolymers are added at a concentration of about 0.007% to about 3% by weight relative to the weight of the at least one portion of flooding fluid.

22. The method of claim 1, wherein said flooding fluid is disposed of.

23. The method of claim 22, wherein the flooding fluid is disposed of at sea, in a disposal well, or in a wastewater pond.

24. The method of claim 1, wherein said aqueous flooding fluid comprises sea water, brine, production water, water recovered from an underground aquifer, or surface water from a stream, river, pond or lake.

25. The method of claim 1, wherein the total monomers in (i) and (ii) are present at less than or equal to about 8 mol %; wherein the hydrolysis level of the one or more ionic polyvinyl alcohol copolymers is greater than or equal to about 90%; and wherein the one or more ionic polyvinyl alcohol copolymers dissolves substantially completely in water at about 25° C. within about 14 hours; increase the shear thinning properties of the flooding fluid.

26. The method of claim 1, wherein the at least one portion of the flooding fluid exhibits a low viscosity during injection into the reservoir and a higher viscosity when flowing through the reservoir.

27. The method of claim 26, wherein the viscosity ratio of the at least one portion of the flooding fluid comprising polymer is at least 1.3 or at least 2.5.

28. The method of claim 1, wherein the aqueous flooding fluid further comprises at least one of the group consisting of hay, sugar cane fibers, cotton seed hulls, textile fibers, shredded paper, bentonite, rubber pulp, wood shavings, nut hulls, polyacrylic amide, carboxymethylcellulose, polysaccharide, polyvinyl alcohol, polyvinyl pyrrolidone, polyacrylic, polystyrene sulfonates, ethylene oxide polymers, methyl cellulose, starch, guar gum, gum tragacanth, sodium alginate, gum Arabic and surfactants.

29. The method of claim 28, wherein the aqueous flooding fluid further comprises starch, guar gum, sodium alginate, gum arabic or methyl cellulose.

30. The method of claim 1, wherein the aqueous flooding fluid further comprises one or more members selected from the group consisting of 1,3-propanediol; an oligomer of 1,3-propanediol; a homopolymer of 1,3-propanediol; and a heteropolymer of 1,3-propanediol, wherein said heteropolymer is synthesized using at least one $C_2$ through $C_{12}$ comonomer diol.

31. The method of claim 1, wherein the sweep efficiency is improved.

32. The method of claim 1, wherein the mobility ratio improves and becomes more favorable to mobilizing oil.

* * * * *